United States Patent [19]
Knudsen

[11] 3,887,864
[45] June 3, 1975

[54] MEASURED-VALUE TRANSDUCER WITH A COMPENSATING BRIDGE CIRCUIT

[75] Inventor: Ole Friis Knudsen, Sonderborg, Denmark

[73] Assignee: Danfoss A/S, Nordborg, Denmark

[22] Filed: Nov. 14, 1973

[21] Appl. No.: 415,568

[30] Foreign Application Priority Data
Nov. 16, 1972 Germany............................ 2256196

[52] U.S. Cl. ............. 323/40; 323/75 A; 323/75 H; 323/75 N; 324/DIG. 1; 340/177 R; 340/186; 340/233
[51] Int. Cl. .............................................. G05f 1/58
[58] Field of Search ............. 323/4, 40, 75 A, 75 H, 323/75 N; 324/DIG. 1; 340/210, 227 R, 233, 177 R, 186; 73/362 R, 362 SC

[56] References Cited
UNITED STATES PATENTS

| | | | |
|---|---|---|---|
| 3,324,378 | 6/1967 | Kupfierberg | 323/40 UX |
| 3,450,978 | 6/1969 | Norman | 324/DIG. 1 |
| 3,495,159 | 2/1970 | Smith | 323/75 H |
| 3,503,261 | 3/1970 | Riester et al. | 340/186 X |
| 3,614,598 | 10/1971 | Meyer | 323/75 H X |
| 3,623,140 | 11/1971 | Nercessian | 323/40 |

*Primary Examiner*—Gerald Goldberg

[57] ABSTRACT

A measuring-transducer circuit arrangement suitable for two-line telemetering systems comprises a bridge circuit, a current regulator, a comparator circuit including a reference element and a reference-voltage resistor for controlling the regulator, and a measuring amplifier. The current regulator and the reference element are in series with a diagonal of the bridge circuit.

13 Claims, 5 Drawing Figures

MEASURED-VALUE TRANSDUCER WITH A COMPENSATING BRIDGE CIRCUIT

The invention relates to a measured-value transducer with a compensating bridge circuit, especially for two-line telemetering systems, in which transducer the input of a measuring amplifier, which permits a compensating current to flow through a compensating resistor of the bridge circuit, is connected into the bridge diagonal; a current regulator, controlled in dependence upon the voltage-drop at a signal-generating resistor, is provided in a lead to the bridge circuit; and a reference element, e.g. a Zener diode, establishing a constant reference voltage, is also associated with the bridge circuit.

British Pat. No. 1,195,617 discloses a measured-value transducer of this kind in which a thermocouple element, connected in series with a fixed resistor in a branch of the bridge, is used as a measuring sensor. Connected in parallel with the compensating bridge circuit is a Zener diode which is intended to keep the bridge voltage constant. The current regulator, together with a reference-voltage resistor which controls it, lies in the common lead to the compensating bridge circuit and the Zener diode. The current regulator is intended to keep the current in the parallel arrangement constant. Part of the signal current that flows through a path parallel to the arrangement described is used as the compensating current.

In two-line telemetering systems it is customary to use a continuously flowing basic current of for example 4 mA, and to superpose upon this basic current a signal current of, for example, 0 − mA so that in all a current of 4 − 20 mA flows. If there is no local voltage source for supplying the measured-value transducer, the power for the transducer must be covered by the basic current. However, a Zener diode consumes approximately 1 mA. The basic current flowing through the entire bridge is correspondingly smaller and the measuring signal that can be sent by the bridge is correspondingly weaker. Furthermore, the Zener voltage leads to a relatively large voltage for operating the compensating bridge circuit. This requires relatively large bridge resistors. However, the larger the bridge resistors, the greater are the temperature-dependent changes in the signal.

The object of the present invention is to provide a measure-value transducer, and especially a measured-value transducer with measuring sensor resisters, that is able to send relatively strong signals with high precision.

According to the invention, this object is achieved by providing, for the purpose of controlling the regulator in dependence upon the basic current flowing through the entire bridge circuit, a comparator circuit which contains the reference element and the reference-voltage resistor and a part of which, containing at least the reference element, lies in series with the bridge circuit and the current regulator.

In this measured-value transducer, the Zener voltage is not in parallel but in series with the voltage at the compensating bridge, This bridge voltage can therefore be kept very much lower than the Zener voltage, e.g. well below 1 V. Consequently, very small bridge resistors can be used. In particular, they may be rated similarly to the measuring sensor resistors which are normally of the order of magnitude of 100 Ohms. The temperature drift is correspondingly small and accuracy in measurement correspondingly great.

Additionally, the current required for operating the reference element also flows through the compensating bridge circuit. The latter is therefore supplied with the greatest possible current. The measurement signals are correspondingly strong.

Particular advantage is achieved if the comparator circuit is a bridge circuit which is the series with the compensating bridge circuit and the current regulator and which contains the reference element in one of its branches, the reference-voltage resistor in its adjacent branch leading to the other diagonal point, and fixed resistors in its other two branches, a regulating amplifier for controlling the current regulator being provided in its diagonal. The entire basic current of the compensating bridge circuit therefore flows through this comparator bridge circuit.

It is advisable for the current regulator to be disposed on that side of the compensating bridge circuit opposite the reference element and for it also to be adjacent the compensating resistor and contained in the loop through which the compensating current flows. In such arrangement, the entire compensating current is introduced into the compensating bridge circuit by way of the current regulater, but does not prevent control being dependent upon the comparator circuit.

If a compensating bridge circuit has only a small bridge voltage, steps must be taken to ensure that its diagonal points are at the voltage level necessary for operating the measuring amplifier. This is achieved by disposing the comparator circuit, which alone ensures a corresponding rise in voltage because of the presence of the reference element, on one side of the bridge circuit, and by disposing the current regulator, at which a voltage-drop likewise occurs, at the other side of the bridg circuit.

In the compensating bridge circuit the two branches adjacent one of the connections may each have a fixed resistor, the third branch a measuring sensor resistor, and the fourth branch the compensating resistor and, optionally, a fixed resistor. This last-mentioned fixed resistor and the measuring sensor resistor may also be transposed. In this arrangement, the two fixed resistors in the first two branches in the measuring zone ensure a desirable division of the bridge current into two parallel paths.

In particular, a compensating lead, branching from a point between the compensating resistor and the fixed resistor or the measuring sensor resistor in the fourth branch, may run through the collector-emitter path of a transistor, controlled by the measuring amplifier, to the supply conductor on that side of the compensating bridge circuit remote from the current regulator.

The current regulator itself may consist of two transistors in a Darlington arrangement, in order to achieve sufficiently great amplification in the regulating circuit.

In accordance with a further feature of the invention, the measuring amplifier is a transistorized differential amplifier and at least one diode, bridged by a resistor, is connected between the current regulator and the compensating bridge circuit. This diode path enables a rise in voltage to be obtained which, even when the voltages at the compensating bridge circuit are very low, results in a sufficiently high voltage for operating the measuring amplifier being made available. The bridging resister facilitates the switch-on operation when a Zener diode, for which a certain minimum current must be available in order to render it conductive, is used as the reference element.

The comparator circuit may also be used for compensating errors which occur as a result of a non-linear behaviour of the sensor element. As is well known, there are progressive sensors in which the initial value rises more than proportionally with the value to be measured, and degreasive sensors in which the initial value rises less than proportionally with the value to be measured.

Thus, it is preferred to pass, across at least part of the reference voltage resistor, a current, which varies in the same or opposite sense with the compensating current, in addition to the basic bridge current or a current proportional thereto. If, in this arrangment, the reference element and the reference voltage resistor are in branches of the bridge that adjoin the connection adjacent the supply conductor, this superposed current can be derived directly by way of the supply conductor.

When a progressive measuring sensor resister is used, at least part of the reference voltage resistor may lie in that stretch of the compensating lead between the transister and the supply conductor. The compensating current itself is then used for offsetting the progressive behaviour of the sensor.

A further possiblity consists in connecting an additional resistor between the current regulator and the compensating bridge circuit, and in running a lead, bypassing the compensating bridge circuit, from the connection point between the current regulator and the additional resistor, across a limiting resistor and at least part of the reference-voltage resistor, and to the supply conductor on that side of the comparator bridge circuit remote from the current regulator. The greater the compensating current the greater also is the current in the by-pass lead. This arrangement offers the advantage that the compensating lead terminates directly in the supply conductor, and when a three-line telemetering system is used, this arrangement can therefore be used for switching on an instrument which only measures the compensating current.

When a degressive measuring sensor resistor is used, it is preferred to connect a resister into the compensating lead between the branch point and the transistor, and to run a branch lead from the connection point between the resistor and the transistor, through a limiting resistor and at least one part of the reference-voltage resistor, and to the supply conductor on that side of the comparator bridge circuit remote from the current regulator. The potential at the connection point decreases as the compensating current rises. Consequently, the current flowing through the branch lead also decreases as the compensating current rises.

The invention will now be described in greater detail by reference to embodiments illustrated in the drawing, in which.

Figure 1:
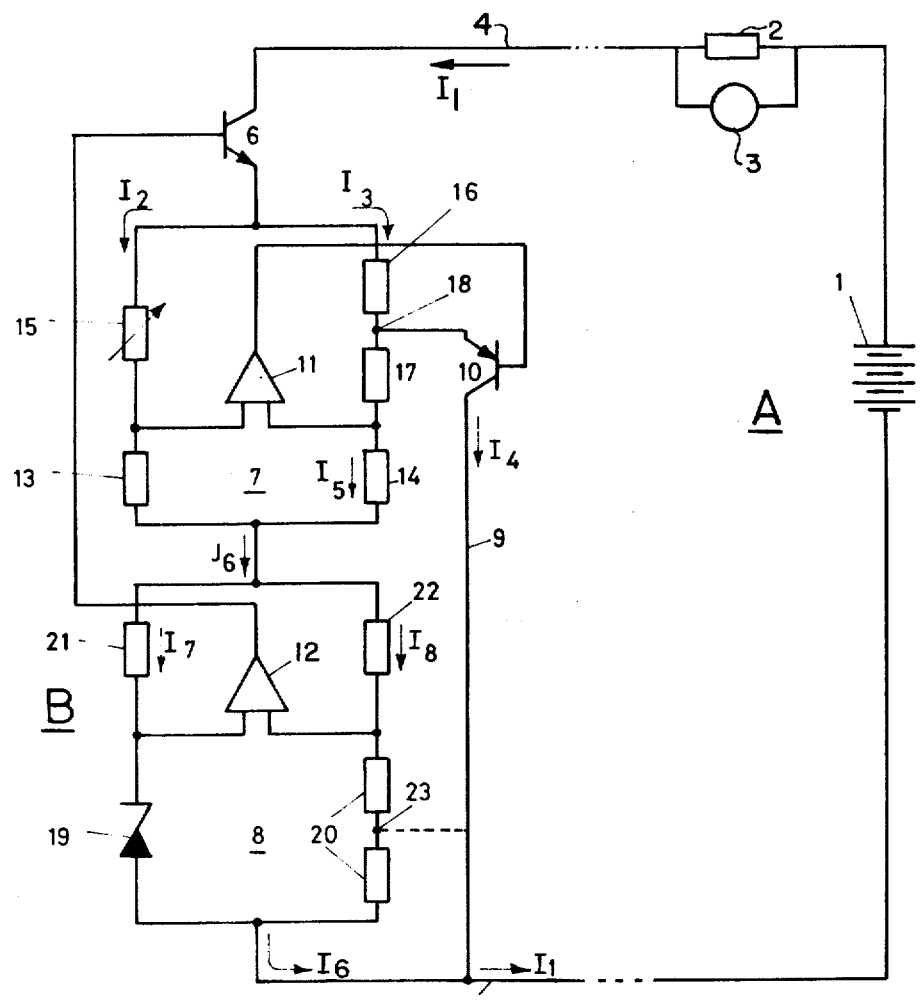
FIG. 1 is a diagrammatic illustration of a first embodiment of the invention.

FIG. 1 shows a two-line system with a central station A which has a voltage source 1, an indicating resister 2 and an indicating apparatus 3. A plurality of local measuring points B can generally be connected to this central station by way of change-over switches. These measuring points are then connected to the central station A through supply conductors 4 and 5, Provided at the local measuring point B are a current regulator 6, in the form of a transistor, a compensating bridge circuit 7 and a comparator bridge circuit 8, these being connected in series. Also provided is a compensating lead 9 with a transistor 10. This transistor 10 is controlled by a measuring amplifier 11 which lies in the diagonal of the compensating bridge circuit. The current regulator 6 is controlled by an amplifier 12 which lies in the diagonal of the comparator bridge circuit 8.

The compensating bridge circuit 7 has two fixed resistors 13 and 14 in each of its branches adjacent the centre connection. Since the amplifier 11 tends to keep the voltage at the diagonal points constant, the resistors 13 and 14 divide the basic bridge circuit into two parallel paths. In the third branch of the bridge is a temperature-responsive measuring sensor resistor 15. In the fourth branch is a fixed compensating resistor 16 and a further resistor 17. When a change occurs in the resistance of the measuring sensor resistor 15, the amplifier 11 so controls the transistor 10 that a compensating current flows through the compensating lead 9 branching from the connection point 18 between the resistors 16 and 17, the magnitude of this compensating current being such that equilibrium is re-established in the bridge as a result of the voltage-drop occurring across the compensating resistor 16.

The comparator bridge circuit has a Zener diode 19 in its first branch, and a reference voltage resistor 20, forming a voltage divider, in the adjacent branch. Two fixed resistors 21 and 22 are provided in the other branches of the bridge. Since the amplifier 12 tends to keep the voltages at the two diagonal points equal to each other, the resistors 21 and 22 are responsible for dividing the basic bridge current into the two paralled paths of the bridge circuit 8. The part-current so defined produces at the reference voltage resistor 20 a voltage-drop which is compared with the fixed voltage at the Zener diode 19. The amplifier 12 so controls the current regulater 6 that there occurs at the reference voltage resistor a constant voltage-drop which is equal to the reference voltage at the Zener diode 19, Consequently the basic bridge current flowing through the entire bridge circuit 7 is also constant.

A total current $I_1$ flows through the supply conductor 4. This total current passes through the current regulator 6 into the compensating bridge circuit 7. Here it divides into two part-currents I2 and I3. The current I3 is again divided at the point 18 into the compensating current I4 and a residual current I5. The part-currents I2 + I5 pass into the comparator bridge circuit 8 as a current I6. There they divide as part-currents I7 and I8 in the two parallel paths, and pass together from this bridge circuit. The sum of this basic bridge current I6 and the compensating current I4 again results in the total current I1. In the above, the supply currents for the amplifiers 11 and 12 have been ignored since they are relatively low.

In two-line metering systems of this kind, a voltage of 12 – 36 V is usually available at the local measuring point B. Taking a Zener voltage of 6.2 V, division of the voltage usable in accordance with the invention results in a voltage-drop of 7 V at the comparator bridge circuit 8, whereas the voltage-drop at the compensating bridge circuit 7 is approximately 0.6 V. The remaining voltage is absorbed at the current regulator 6.

Figure 2:
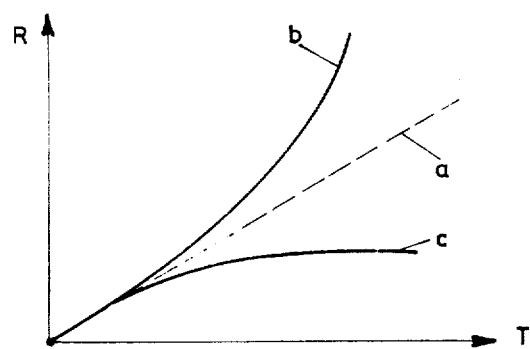
FIG. 2 is a resistance-temperature graph.

Referring to FIG. 2, the resistance R of a measuring sensor resistor 15 is plotted against temperature T. Numerous resistors do not have a linear characteristic curve (a), but rather a progressive characteristic curve (b) or a degressive one (c).

If, in FIG. 1, the compensating lead 9 is not directly connected to the supply conductor 5 but to a point 23 on part of the reference-voltage resistor 20, the basic bridge current 16 will no longer be kept constant but will be corrected in dependence upon the compensating current. A progressive measuring sensor resistor 15 would give excessively high measured values if the basic bridge current 16 were kept constant. If however the compensating current is passed through a part of the reference-voltage resistor 20, one of the diagonal points of the comparator bridge circuit 8 is artificially raised, and the basic bridge current 16 is thus reduced. This step leads to an output signal which takes into account the progressive characteristic curve of the measuring sensor element 15.

Figure 3:
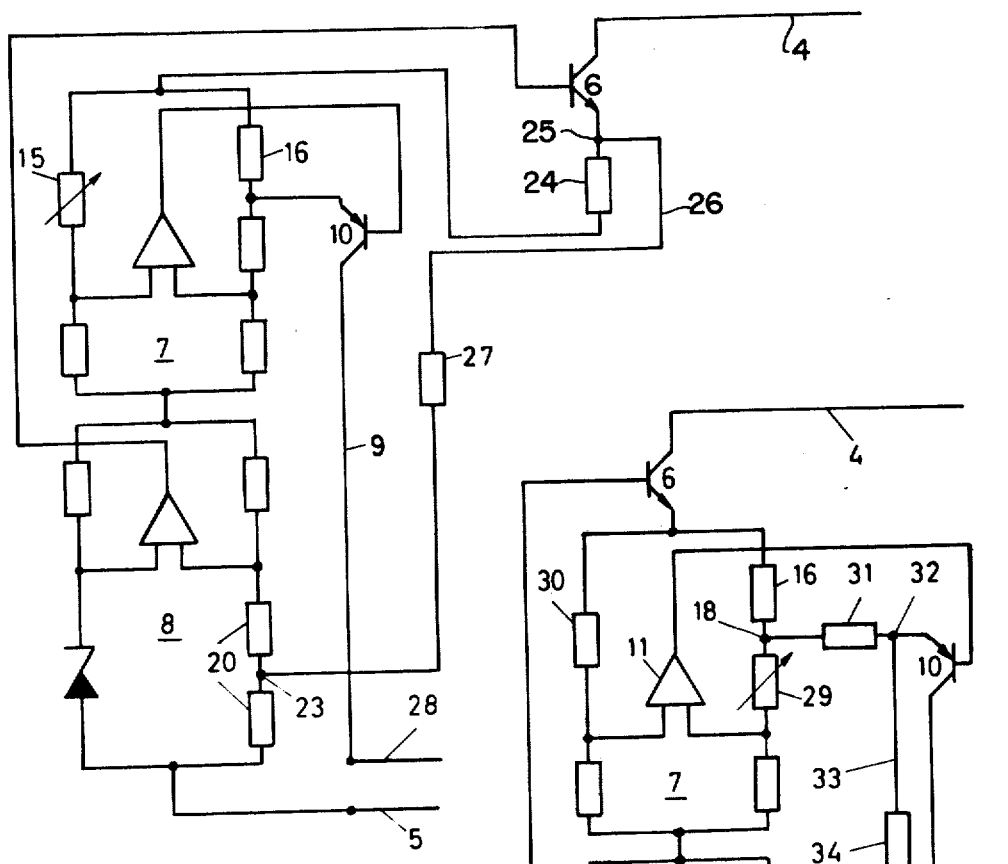
FIG. 3 shows a second embodiment of the invention.

A modified form of measured-value transducer for a progressive measuring sensor resistor 15 is shown in FIG. 3, in which the same reference symbols as before are used for all the components. In this arrangement, an additional resistor 24 is connected between the current regulator 6 and the compensating bridge circuit 7. A by-pass lead 26 with a limiting resistor 27 runs from the connection point 25 between the current regulator 6 and the additional resistor 24 to point 23 on part of the reference-voltage resistor 20. In this arrangement, a current, which is determined by the difference in the voltages at the points 25 and 23, flows through the lower part of the reference-voltage resistor 20. Due to the voltage-drop at the resistors 24 and 16, this voltage diffrnece rises with the compensating current. Correction is therefore carried out in the same manner as previously described. In this arrangement however, the compensating lead 9 does not need to be used for making the correction. Therefore, instead of connecting it to the supply conductor 5, it can pass through a third lead 28 to the central measuring point where an instrument for measuring only the compensating current can be provided between the supply conductor 5 and the third lead 28.

Figure 4:
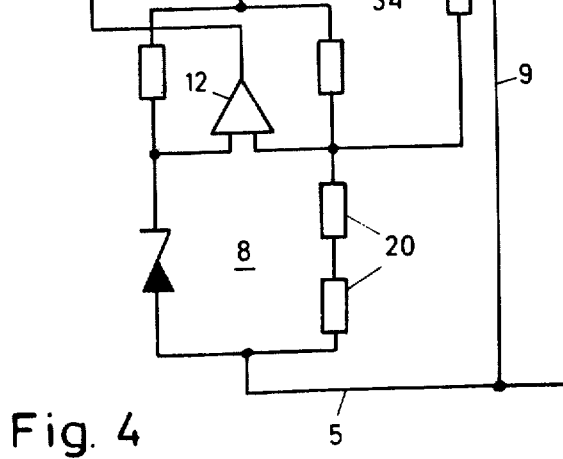
FIG. 4 shows a third embodiment of the invention.

In the embodiment shown in FIG. 4, a measuring sensor resistor 29 is arranged in series with the compensating resistor 16 in the fourth branch of the compensating bridge circuit 7. A fixed resistor 30 is provided in the third branch. The measuring sensor resistor 29 has a degressive characteristic curve. In this arrangement, a resistor 31 is connected into the compensating lead 9 between the connection points 18 and the transistor 10. A branch lead 33 runs from the connection point 32 between the resistor 31 and the transistor 10, by way of a limiting resistor 34 to one of the diagonal points of the comparator bridge circuit 8.

In this case it is assumed that the measuring sensor resistor 29 has a negative characteristic curve. As temperature rises, resistance falls. In order to maintain equilibrium in the bridge, the amplifier 11 so controls the transistor 10 that a compensating current flows through the compensating resistor 16.

Moreover, the characteristic curve of the measuring sensor resister 29 is degressive. This is corrected in the following manner: the greater the compensating current through the compensating lead 9, the greater is the extent to which the potential at the connection point 32 drops and the smaller is the current flowing through the branch lead 33 and the signal-generating resistor 20. The compensating current and the branch current therefore change in opposite directions. However, the smaller the branch current, the lower is the voltage at the diagonal point of the comparator bridge circuit 8. The basic current 16 flowing through the bridges is therefore increased by appropriate control of the current regulator 6 by means of the amplifier 12. In this way the effects of the degressive characteristic curve are offset.

Figure 5:
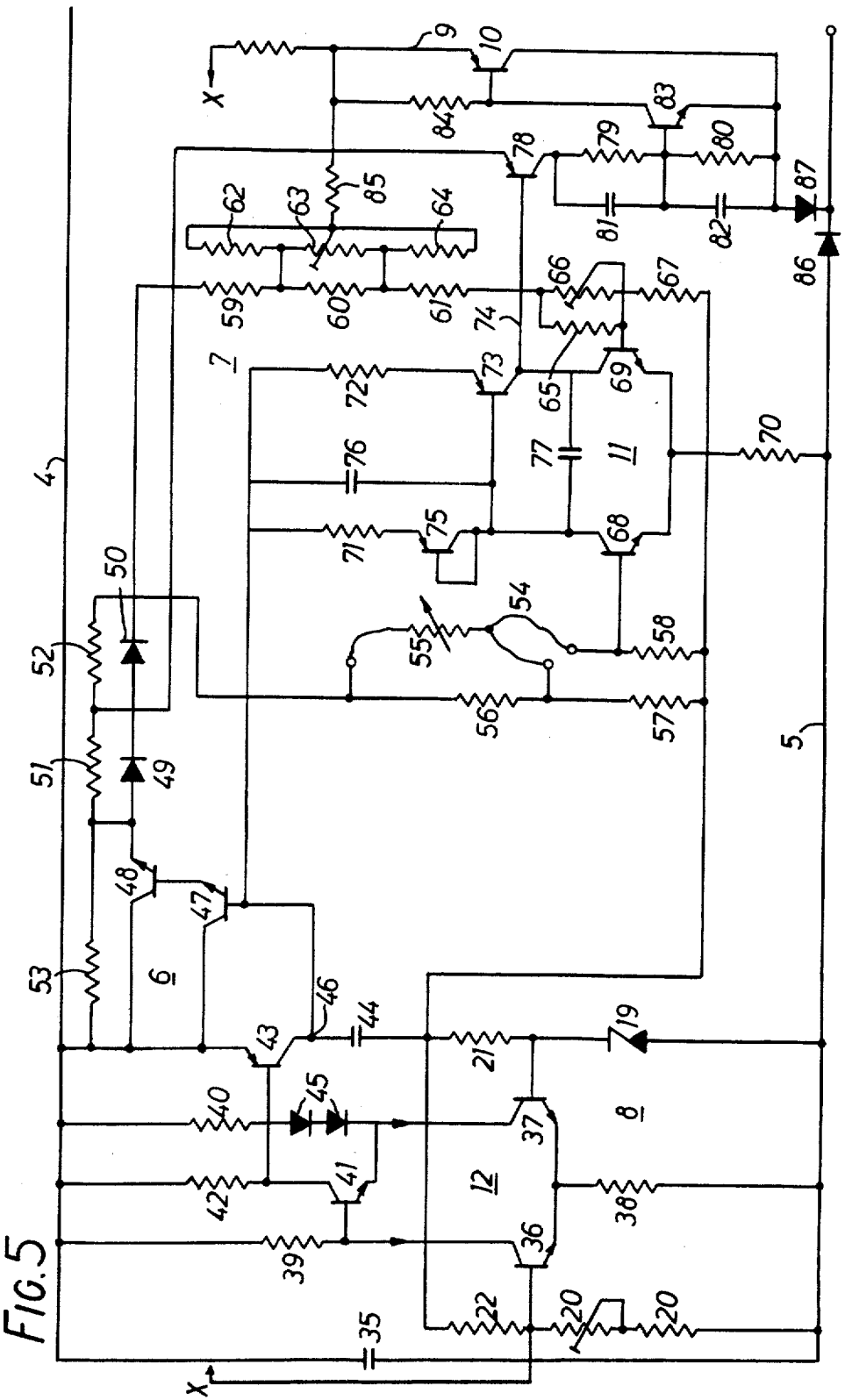
FIG. 5 shows a connection diagram for a measured-value transducer having a platinum wire sensor.

The connection diagram seen in FIG. 4 can also be used for degressive measuring sensors having a positive characteristic curve, e.g. for platinum wire sensors, if the resistor 30 and the measuring sensor 29 are transposed as shown in the example seen in FIG. 5.

In FIG. 5, a condenser 35 is connected between the supply conductors 4 and 5. The comparator bridge circuit again consists of the Zener diode 19, the reference-voltage resistor 20 and the fixed resistors 21 and 22.

The amplifier 12 is a differential amplifier with two transistors 36 and 37 which have a common emitter resistor 38, and each a collector resistor 39 and 40 respectively.

By way of the transistor 41, the voltage differnce between the two collectors of the transistors 36 and 37 control a current through the resistor 42 and the base-emitter path of the transistor 43. The diodes 45 are used for compensating the temperature in the transistors 41 and 43.

Part of the collector current of the transistor 43 controls the current regulator 6 which is here formed by two transistors 47 and 48 in a Darlington arrangement. The regulator 6 controls a current flowing through the compensation bridge to the comparator bridge in a manner necessary for establishing equilibrium. The condenser 44 is used only as a means for decoupling the supply voltage of the amplifier 11.

Connected between the current regulator 6 and the compensating bridge circuit 7 are two diodes 49 and 50, each bridged by a resistor 51 and 52 respectively; als, a resistor 53 bridges the collector-emitter path of the transistor 48. A voltage-drop of 0.6 V occurs at each of these diodes. The resistors 51 – 53 enable the Zener diode 19 to receive sufficient current when the system is switched on.

The compensating bridge circuit 7 has a platinum wire 54 as the measuring sensor. Together with the resistors 55, 56, 57 and 58, it forms the two branches of the bridge corresponding to the resistors 13 and 15 of FIG. 1. The other two branches of the bridge are formed by the resistors 59, 60, 61, 62, 63, 64, 65, 66 and 67, which correspond to the resistors 14, 16 and 18 or FIG. 1.

The measuring amplifier 11 is a differential amplifier with two transistors 68 and 69 which have a common emitter resistor 70, each having a collecter resistor 71 and 72 respectively. With the aid of a transistor 73, there is induced in the lead 74 a current which is equal to the difference between the currents flowing through the emitter-collector paths of the transistors 68 and 69. A transistor 75, short-circuited between the base and the collector, is used for compensating the temperature of the transistor 73. Two condensers 76 and 77 are also provided.

A transistor 78 is controlled in dependence upon the current in the lead 74 for the purpose of controlling the transistor 10 in the compensating lead 9. The collector-emitter path of the transistor 78 is connected in series with two resistors 79 and 80 which are bridged by condensers 81 and 82. A transistor 83, the collector-emitter path of which is in series with a resistor 84, is controlled by the voltage between the resistors 79 and 80. The base of the transistor 10 is influenced in this way. Also provided in the compensating lead 9 are a resistor 85 and a resistor 88. From the junction between the resistor 85 and the emitter of the transistor 10, a branch lead runs through a resistor 88 to a diagonal point in the comparator bridge 8 that is disposed opposite the Zener diode 19.

Diodes 86 and 87 are connected respectively into the supply conductor 5 and the compensating lead 9.

In one form of two-line telemetering system in which the basic current was 4 mA and the signal current 0 – 16 mA, the following division of current over the various branches was obtained: The basic bridge current was 3.9 mA. In the compensating measuring circuit a current of 0.9 mA flowed through the path containing the compensating resistor, and a current of 3 mA flowed through the other path of the bridge. In the comparator bridge circuit a current of 3.4 mA flowed through the branch containing the Zener diode, and a current of 0.5 mA through the other path of the bridge. The supply current for the measuring amplifier 11 was 30 $\mu$A, and the supply current for the comparator amplifier 12 was 80 $\mu$A.

I claim:

1. A measuring-transducer circuit arrangement suitable for a two-line telemetering system, the circuit arrangement comprising: a first bridge circuit including a compensating resistor and having two bridge diagonals; a current regulator; a comparator circuit comprising a Zener diode forming a reference element for establishing a constant reference voltage and a reference-voltage resistor for developing a voltage used for controlling said current regulator; and a measuring amplifier connected to one of said bridge diagonals, said measuring amplifier controlling a compensating current which in use flows in said compensating resistor; said current regulator and said Zener diode being connected in a series path which also includes the other of said bridge diagonals said series path having two ends respectively for connection to said two lines of said telemetering system.

2. A measuring-transducer circuit arrangement according to claim 1 wherein said comparator circuit is a second bridge circuit having two bridge diagonals, one of said bridge diagonals of said second bridge circuit being connected in series with said other bridge diagonal of said first bridge circuit, and further comprising two fixed resistors which, with said Zener diode and said reference-voltage resistor respectively form the four branches of said second bridge circuit, and a regulating amplifier for controlling said current regulator and connected across the other bridge diagonal of said second bridge circuit.

3. A measuring-transducer circuit arrangement according to claim 1 wherein said current regulator is disposed on that side of said first bridge circuit opposite said Zener diode, and is also adjacent to said compensating resistor and contained in a current loop through which in use said compensating current flows.

4. A measuring-transducer circuit arrangement according to claim 1 wherein in said first bridge circuit the two branches adjacent to one of the bridge terminals each comprise a fixed resistor, the third branch comprises a measuring sensor resistor, and the fourth branch comprises said compensating resistor.

5. A measuring-transducer circuit arrangement according to claim 1 wherein in said first bridge circuit the two branches adjacent to one of the bridge terminals comprise a fixed resistor, the third branch comprises a fixed resistor, and the fourth branch comprises said compensating resistor and a measuring sensor resistor.

6. A measuring-transducer circuit arrangement according to claim 5 wherein a compensating lead, branching from a point between said compensating resistor and said measuring sensor resistor in the fourth branch, connects with the collector-emitter path of a transistor, controlled by said measuring amplifier, and thence to a supply conductor on that side of said first bridge circuit remote from said current regulator.

7. A measuring-transducer circuit arrangement according to claim 1 wherein said current regulator comprises two transistors connected in Darlington configuration.

8. A measuring-transducer circuit arrangement according to claim 3 wherein said measuring amplifier is a differential amplifier comprising three transistors, and at least one diode bridged by a resistor is connected between said current regulator and said first bridge circuit.

9. A measuring-transducer circuit arrangement according to claim 1 wherein, in addition to the basic bridge current, a current which varies in the same or opposite sense with said compensating current is passed through at least part of said reference voltage resistor.

10. A measuring-transducer circuit arrangement according to claim 9 wherein said Zener diode and said reference-voltage resistor are in branches of said first bridge circuit that adjoin the connection adjacent to a supply conductor.

11. A measuring-transducer circuit arrangement according to claim 9 wherein, when a progressive measuring sensor resistor is used, at least part of said reference-voltage resistor lies in a compensating lead between a transistor and one of said lines of said telemetering system.

12. A measuring-transducer circuit arrangement according to claim 9 wherein, when a progressive measuring sensor resistor is used, an additional resistor is connected between said current regulator and said first bridge circuit, and a lead, by-passing said first bridge circuit, runs from the connection point between said current regulator and said additional resistor, through a limiting resistor and at least part of reference-voltage resistor to said supply conductor on that side of said first bridge circuit remote from said current regulator.

13. A measuring-transducer circuit arrangement according to claim 9 wherein, when a degressive measuring sensor resistor is used, a further resistor is connected into the compensating lead between a terminal of said first bridge circuit and a transistor, and a branch lead runs from the connection point between said further resistor and said transistor, through a limiting resistor and at least part of said reference-voltage resistor to one of said lines of said telemetering system on that side of said first bridge circuit remote from said current regulator.

* * * * *